United States Patent
Iwafuchi et al.

(10) Patent No.: US 10,362,198 B2
(45) Date of Patent: Jul. 23, 2019

(54) COLOR PROCESSING DEVICE, COLOR PROCESSING SYSTEM AND NON-TRANSITORY COMPUTER READABLE MEDIUM STORING PROGRAM

(71) Applicant: FUJI XEROX CO., LTD., Tokyo (JP)

(72) Inventors: Toshihiro Iwafuchi, Yokohama (JP); Noriko Sakai, Yokohama (JP); Masashi Morimoto, Yokohama (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 15/784,630

(22) Filed: Oct. 16, 2017

(65) Prior Publication Data
US 2018/0124288 A1  May 3, 2018

(30) Foreign Application Priority Data
Oct. 27, 2016 (JP) .................. 2016-210150

(51) Int. Cl.
*H04N 1/60* (2006.01)
*G06T 11/00* (2006.01)

(52) U.S. Cl.
CPC ......... *H04N 1/6058* (2013.01); *G06T 11/001* (2013.01); *H04N 1/6025* (2013.01)

(58) Field of Classification Search
None
See application file for complete search history.

(56) References Cited

U.S. PATENT DOCUMENTS

| 5,272,518 | A | * | 12/1993 | Vincent | G01J 3/12 250/226 |
| 5,317,426 | A | * | 5/1994 | Hoshino | H04N 1/6058 358/501 |
| 5,450,216 | A | * | 9/1995 | Kasson | H04N 1/6058 345/603 |
| 6,633,410 | B1 | * | 10/2003 | Narushima | H04N 1/6052 358/1.9 |
| 6,744,537 | B1 | * | 6/2004 | Chiba | H04N 1/00687 358/404 |
| 2001/0014174 | A1 | * | 8/2001 | Yamamoto | G06F 3/04897 382/167 |

(Continued)

FOREIGN PATENT DOCUMENTS

| JP | 2005-057570 A | 3/2005 |
| JP | 2011-059900 A | 3/2011 |

*Primary Examiner* — Anh-Vinh T Nguyen
(74) *Attorney, Agent, or Firm* — Sughrue Mion, PLLC (57) ABSTRACT

A color processing device includes: a color data obtaining unit obtaining color data of a first image displayed on a display based on image data as first color data and color data of a second image formed on a recording medium by an image forming device based on the image data as second color data; and a conversion relationship creation unit creating a conversion relationship to correct the image data to be outputted to the image forming device based on the first color data and the second color data to integrate colors of the images displayed on the display and formed by the image forming device, wherein the conversion relationship creation unit creates the conversion relationship to increase a correction amount as a color to be corrected comes closer to gray and to reduce a correction amount as a color to be corrected comes closer to white.

17 Claims, 7 Drawing Sheets

(56) References Cited

U.S. PATENT DOCUMENTS

| | | | |
|---|---|---|---|
| 2003/0081831 A1* | 5/2003 | Fukao | H04N 1/6025 382/167 |
| 2003/0179398 A1* | 9/2003 | Takano | H04N 1/40 358/1.9 |
| 2003/0231193 A1* | 12/2003 | Shimazaki | G09G 5/003 345/690 |
| 2004/0183813 A1* | 9/2004 | Edge | H04N 1/6052 345/600 |
| 2004/0190019 A1* | 9/2004 | Li | H04N 1/6033 358/1.9 |
| 2005/0036162 A1* | 2/2005 | Edge | H04N 1/6011 358/1.9 |
| 2005/0128316 A1* | 6/2005 | Sugimori | H04N 1/6011 348/223.1 |
| 2005/0180645 A1* | 8/2005 | Hasegawa | G06K 9/00456 382/239 |
| 2005/0275911 A1* | 12/2005 | Yamada | H04N 1/60 358/518 |
| 2006/0132867 A1* | 6/2006 | Sugiyama | G09G 5/003 358/504 |
| 2006/0140477 A1* | 6/2006 | Kurumisawa | H04N 1/4074 382/169 |
| 2006/0181723 A1* | 8/2006 | Edge | H04N 1/6033 358/1.9 |
| 2007/0132572 A1* | 6/2007 | Itoh | B60K 35/00 340/462 |
| 2008/0007784 A1* | 1/2008 | Tsuji | H04N 1/603 358/2.1 |
| 2008/0007806 A1* | 1/2008 | Shirasawa | H04N 1/6058 358/520 |
| 2008/0018962 A1* | 1/2008 | Kawai | H04N 1/6019 358/522 |
| 2009/0041348 A1* | 2/2009 | Someya | G09G 3/2007 382/167 |
| 2009/0041380 A1* | 2/2009 | Watanabe | G06F 21/84 382/276 |
| 2009/0059263 A1* | 3/2009 | Hasegawa | H04N 1/6011 358/1.13 |
| 2009/0213434 A1* | 8/2009 | Ito | H04N 1/54 358/3.23 |
| 2009/0289968 A1* | 11/2009 | Yoshida | G09G 3/2025 345/691 |
| 2009/0295842 A1* | 12/2009 | Okada | G09G 3/3406 345/690 |
| 2010/0054592 A1* | 3/2010 | Nanu | G06T 5/008 382/167 |
| 2010/0214310 A1* | 8/2010 | Kuwahara | G09G 5/02 345/590 |
| 2011/0228300 A1* | 9/2011 | Takeo | G06F 3/1219 358/1.9 |
| 2012/0182416 A1* | 7/2012 | Kawaguchi | H04N 9/3185 348/128 |
| 2013/0250322 A1* | 9/2013 | Kawabata | H04N 1/60 358/1.9 |
| 2015/0138595 A1* | 5/2015 | Sugimoto | H04N 1/0044 358/1.15 |
| 2016/0092749 A1* | 3/2016 | Sakamoto | G06T 7/0012 382/131 |
| 2017/0132488 A1* | 5/2017 | Asanuma | G06K 9/4671 |
| 2018/0025476 A1* | 1/2018 | Akahane | H04N 1/52 382/106 |
| 2018/0160082 A1* | 6/2018 | Koike | H04N 9/312 |
| 2018/0234591 A1* | 8/2018 | Ochiai | B41J 2/525 |

* cited by examiner

COLOR PROCESSING DEVICE, COLOR PROCESSING SYSTEM AND NON-TRANSITORY COMPUTER READABLE MEDIUM STORING PROGRAM

CROSS REFERENCE TO RELATED APPLICATIONS

This application is based on and claims priority under 35 USC § 119 from Japanese Patent Application No. 2016-210150 filed Oct. 27, 2016.

BACKGROUND

Technical Field

The present invention relates to a color processing device, a color processing system and a non-transitory computer readable medium storing a program.

Related Art

In recent years, product design has been created with CG (Computer Graphics) or the like by use of computer devices, such as PCs (Personal Computers) or other devices in many cases. In these cases, a designer creates design by outputting product images on a display, such as a liquid crystal display, connected to the PC or the like.

On the other hand, for example, there is a case in which the image is outputted onto a recording medium, such as a paper sheet, and both images outputted to the display and to the recording medium are referred to review the product design.

SUMMARY

According to an aspect of the present invention, there is provided a color processing device including: a color data obtaining unit that obtains first color data that is color data of a first image displayed on a display based on image data and second color data that is color data of a second image formed on a recording medium by an image forming device based on the image data; and a conversion relationship creation unit that creates a conversion relationship to correct the image data to be outputted to the image forming device based on the first color data and the second color data to integrate colors of the image displayed on the display and the image formed on the recording medium by the image forming device, wherein the conversion relationship creation unit creates the conversion relationship that performs correction to increase a correction amount as a color to be corrected comes closer to gray and to reduce a correction amount as a color to be corrected comes closer to white.

BRIEF DESCRIPTION OF THE DRAWINGS

An exemplary embodiment of the present invention will be described in detail based on the following figures, wherein.

DETAILED DESCRIPTION

Hereinafter, an exemplary embodiment according to the present invention will be described in detail with reference to attached drawings.

<Description of Entire Color Processing System>

Figure 1:
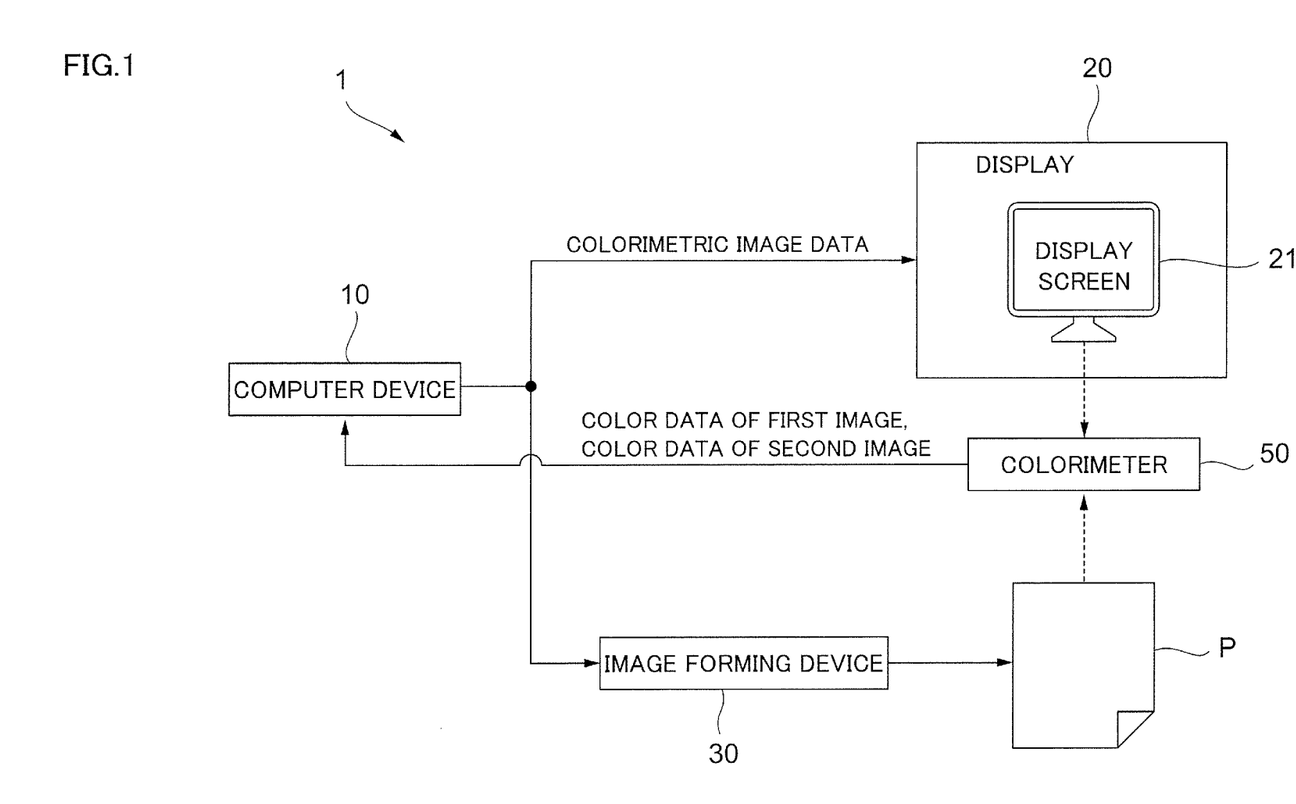
FIG. 1 is a diagram showing an example of a configuration of a color processing system to which the exemplary embodiment is applied.

FIG. 1 is a diagram showing an example of a configuration of a color processing system 1 to which the exemplary embodiment is applied.

The color processing system 1 includes: a computer device 10 that creates image data (image information) or the like; a display 20 that displays an image based on the image data; and an image forming device 30 that forms the image on a recording medium P based on the image data.

In the color processing system 1, the computer device 10 and the display 20 are connected via, for example, a DVI (Digital Visual Interface). Note that, it may be possible to perform connection via an HDMI (High-Definition Multimedia Interface: a registered trademark) or a DisplayPort instead of the DVI. Moreover, the computer device 10 and the image forming device 30 are connected via, for example, a LAN (Local Area Network).

The computer device 10 is a so-called general-purpose personal computer (PC). Then, under the control of an OS (Operating System), the computer device 10 performs creation of image data or the like by causing various kinds of application software to operate.

Note that the computer device 10 may include, for example, a not-shown keyboard device or mouse device as an input device.

Figure 2:
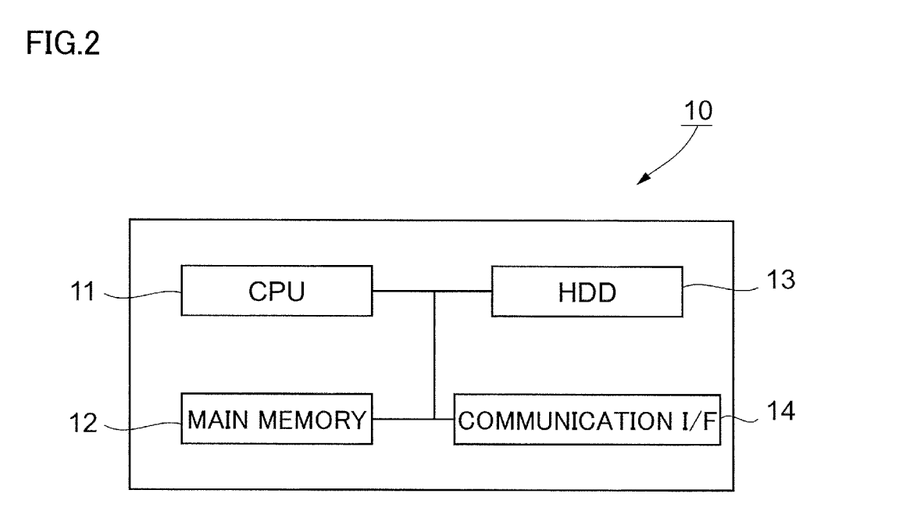
FIG. 2 is a diagram showing a hardware configuration of a computer device.

FIG. 2 is a diagram showing a hardware configuration of the computer device 10.

The computer device 10 is implemented by a personal computer or the like as described above. As shown in the figure, the computer device 10 includes: a CPU (Central Processing Unit) 11 as a computation unit; a main memory 12 as a storage unit; and an HDD (Hard Disk Drive) 13. Here, the CPU 11 executes various kinds of programs, such as an OS (Operating System) or application software. Moreover, the main memory 12 is a storage region that stores various kinds of programs or data or the like used for executing thereof, and the HDD 13 is a storage region that stores input data for various kinds of programs or output data from various kinds of programs. Further, the computer device 10 includes a communication interface (hereinafter, referred to as "communication I/F") 14 for communicating with the outside including the display 20 or the image forming device 30.

The display 20 displays an image based on image data. The display 20 is composed of a device having a function of displaying an image by additive color mixture, such as, for example, a liquid crystal display for PC, a liquid crystal display television or a projector. Consequently, the display method in the display 20 is not limited to the liquid crystal display method. Here, in the exemplary embodiment, suppose that the display 20 displays an image by use of three colors of red (R), green (G) and blue (B). Note that, since FIG. 1 exemplifies a case in which a liquid crystal display for PC is used as the display 20, a display screen 21 is provided inside the display 20; however, when, for example, a projector is used as the display 20, the display screen 21 is a screen or the like provided outside the display 20.

The image forming device 30 is a device that forms an image on a recording medium P, such as a paper sheet, based on image data and outputs thereof as a printed medium. The image forming device 30 includes a printing function, and may include, in addition thereto, other image processing functions, such as, for example, a scanning function or a facsimile function.

Figure 3:
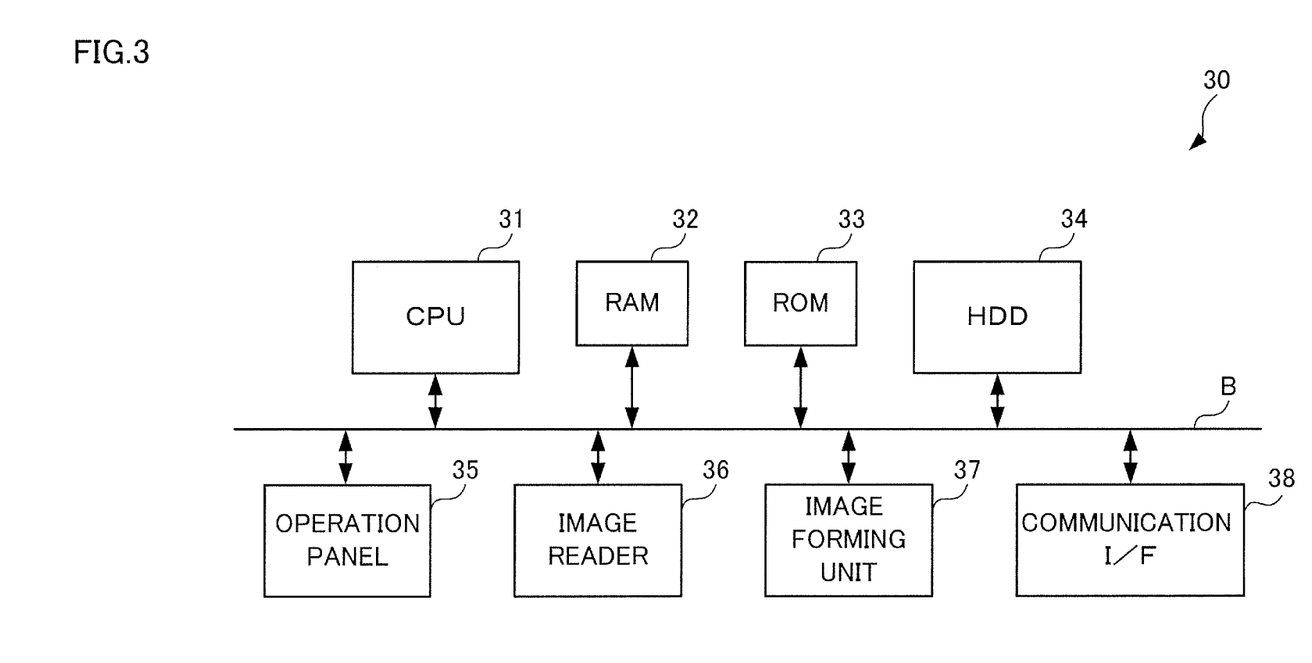
FIG. 3 is a diagram showing a hardware configuration of an image forming device.

FIG. 3 is a diagram showing a hardware configuration of the image forming device 30.

As shown in the figure, the image forming device 30 includes: a CPU 31; a RAM (Random Access Memory) 32; a ROM (Read Only Memory) 33; an HDD 34; an operation panel 35; an image reader 36; an image forming unit 37; and a communication I/F 38. These components exchange required data via a bus B.

The CPU 31 loads various kinds of programs stored in the ROM 33 or the like into the RAM 32 and executes thereof, to implement each function to be described later.

The RAM 32 is a memory used as a working memory or the like for the CPU 31.

The ROM 33 is a memory for storing various kinds of programs executed by the CPU 31.

The HDD 34 is, for example, a magnetic disk device that stores image data read by the image reader 36, image data used in image formation in the image forming unit 37 or the like.

The operation panel 35 is, for example, a touch panel that displays various kinds of information items or accepts an operation input by a user.

The image reader 36 reads an image recorded on a document. Here, the image reader 36 is, for example, a scanner, in which a CCD system that reduces reflected light of light emitted to a document from a light source by a lens and receives the reduced reflected light by a CCD (Charge Coupled Devices), a CIS system that receives reflected light of light sequentially emitted to a document from an LED light source by a CIS (Contact Image Sensor), or the like is employed.

The image forming unit 37 is an example of a printing mechanism that forms an image on a recording medium P. Here, the image forming unit 37 is, for example, a printer, and a printer of an electrophotographic system that forms an image by transferring toner attached to a photoreceptor onto a recording medium P, such as a sheet, or a printer of an ink jet system that forms an image by ejecting ink onto a recording medium P may be used.

The communication I/F 38 transmits and receives various kinds of information items with other devices via a network.

Here, in FIG. 1, together with the color processing system 1, a colorimeter 50 used to read an image displayed on the display screen 21 of the display 20 or an image formed onto a recording medium P by the image forming device 30 is shown.

The colorimeter 50 includes a sensor (not shown) that reads an image in three colors of red (R), green (G), and blue (B), and is capable of measuring the image displayed on the display screen 21 or the image formed on the recording medium P in so-called full-color. Moreover, in the example shown in FIG. 1, the colorimeter 50 and the computer device 10 are connected via, for example, a USB, to be capable of sending measured color data to the computer device 10.

The color processing system 1 operates, for example, as follows.

In the color processing system 1, image data for a colorimetric image (colorimetric image data) is created in the computer device 10. The colorimetric image data is transmitted to the display 20 to cause the display screen 21 of the display 20 to display the colorimetric image based on the colorimetric image data. On the other hand, the colorimetric image data is also transmitted to the image forming device 30 and the colorimetric image based on the colorimetric image data is formed onto the recording medium P by the image forming device 30.

Then, the colorimetric image displayed on the display screen 21 and the colorimetric image formed on the recording medium P are read by the colorimeter 50 to obtain respective color data items. The computer device 10 creates a conversion relationship that corrects image data to be outputted to the image forming device 30 based on these color data items. Though details will be described later, the conversion relationship aims to integrate colors in the image displayed on the display screen 21 of the display 20 and the image formed on the recording medium P by the image forming device 30. Consequently, the computer device 10 functions as a color processing device that corrects image data to be outputted to the image forming device 30 for integrating colors in the image displayed on the display 20 and the image formed by the image forming device 30.

The image formed on the recording medium P is affected by an illumination environment, such as a color temperature of illumination. Therefore, a color perceived by a user, such as a designer, varies depending on the illumination environment. As a result, through based on similar image data items, colors in the image displayed on the display screen 21 of the display 20 and the image formed on the recording medium P do not coincide with each other in some cases. As a result, as described above, for a user, such as a designer who reviews product design while looking at both images, a problem in which colors of the product cannot be accurately perceived occurs. Other than this, when a printed material in which an image has been formed onto a recording medium P is brought to a printing company to discuss the printed material based thereon, since perceivable color is varied due to an illumination environment in the place where the material is brought, accurate result cannot be obtained in some cases. Further, when the printed material is a final product, such as a poster, colors that can be similarly perceived are varied due to an illumination environment in the place where the printed material is viewed; therefore, the colors result in those different from supposition in some cases.

Accordingly, to form an image on the recording medium P, it is necessary to adjust the colors in conformity to an illumination environment of the place where the image is viewed. For that purpose, it is required to correct image data used in forming the image to conform to the illumination environment.

However, in conventional correction methods, color adjustment is performed based on the premise that color adaption of a user viewing the image perfectly occurs or that the color adaption does not occur at all. However, for example, when the image displayed on the display screen 21 of the display 20 and the image formed on the recording medium P are compared with each other, since white in the display screen 21 and white in the recording medium P are mixed in the respective cases, color perception of a person differs depending on which white is referred to for perceiving colors. In the conventional correction methods, color adjustment in this state is difficult.

In the correction methods on the premise of the state in which the color adaption perfectly occurs, correction of a low-saturation color, in particular, gray, is hardly performed, and for this reason, the user feels that the colors in the respective images are not integrated.

Therefore, in the exemplary embodiment, image data is corrected by the correction method described below. Hereinafter, a description will be given of the computer device 10 that implements this.

<Description of Computer Device 10>

Figure 4:
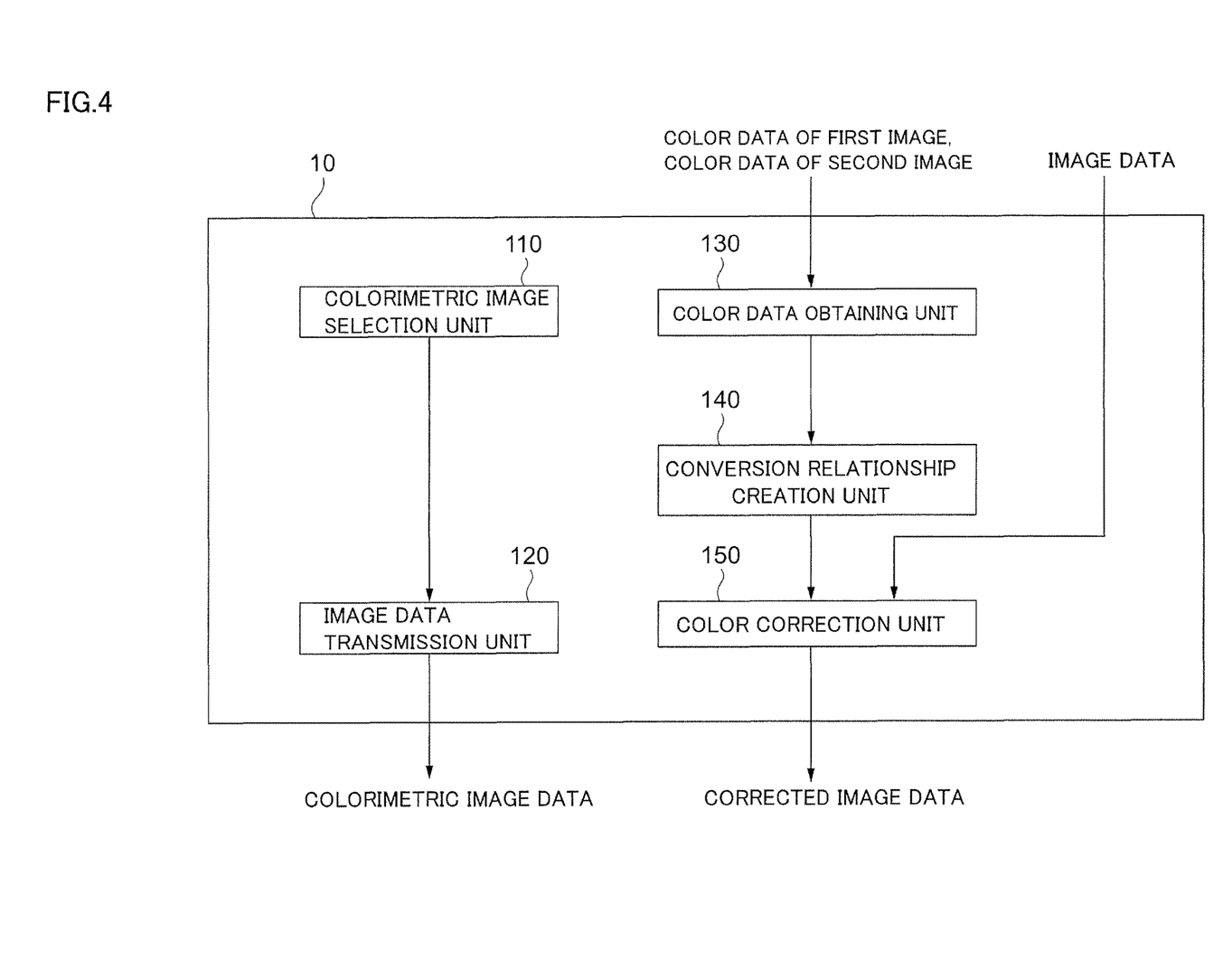
FIG. 4 is a block diagram showing a functional configuration example of the computer device according to the exemplary embodiment.

FIG. 4 is a block diagram showing a functional configuration example of the computer device 10 according to the exemplary embodiment.

The computer device 10 shown in the figure includes: a colorimetric image selection unit 110; an image data transmission unit 120; a color data obtaining unit 130; a conversion relationship creation unit 140; and a color correction unit 150.

The colorimetric image selection unit 110 selects the above-described colorimetric image. In the exemplary embodiment, the colorimetric image is a white image.

The image data transmission unit 120 outputs the colorimetric image data that is the image data of the colorimetric image selected by the colorimetric image selection unit 110 toward the display 20 and the image forming device 30 for performing color adjustment of the display 20. The colorimetric image data is outputted as RGB data that is color signals of R, G, B in the RGB color space. In the exemplary embodiment, since the colorimetric image is the white image, the colorimetric image data has a value of (R, G, B)=(255, 255, 255) when the RGB data is represented by 8 bits (256 gradations from 0 to 255).

In the display 20, the colorimetric image is displayed on the display screen 21 based on the colorimetric image data transmitted from the image data transmission unit 120. Here, the image displayed on the display 20 based on the colorimetric image data is assumed to be a first image. Colors of the first image displayed on the display screen 21 are read by the colorimeter 50.

On the other hand, in the image forming device 30, an image is formed on a recording medium P based on the colorimetric image data transmitted from the image data transmission unit 120. Here, the image formed on the recording medium P by the image forming device 30 based on the colorimetric image data is assumed to be a second image. Colors of the second image formed on the recording medium P are read by the colorimeter 50.

Note that the place where measurement is performed by the colorimeter 50 is the place where the user actually views the image displayed on the display screen 21 or the image formed on the recording medium P. In other words, measurement is performed in the illumination environment in which the user actually views the image.

Then, the colorimeter 50 transmits color information (color data) obtained by reading the first image and the second image to the computer device 10. At this time, the color data outputted by the colorimeter 50 is, for example, respective color values of X, Y and Z in the XYZ color space. Note that, hereinafter, the color data obtained by reading the first image is referred to as first color data and the color data obtained by reading the second image is referred to as second color data in some cases. Moreover, the first color data may be color data of another color space converted from the color data obtained by reading the first image, and similarly, the second color data may be color data of another color space converted from the color data obtained by reading the second image.

The color data obtaining unit 130 obtains the first color data and the second color data transmitted by the colorimeter 50.

To integrate the colors of the image displayed on the display 20 and the image formed on the recording medium P by the image forming device 30, the conversion relationship creation unit 140 creates a conversion relationship for correcting image data to be outputted to the image forming device 30 based on the first color data and the second color data.

For creating the conversion relationship, first, the conversion relationship creation unit 140 calculates a difference between the first color data and the second color data.

The color space for calculating the difference is not particularly limited. Consequently, though the difference may be calculated in the XYZ color space, the L*a*b* color space is used in the exemplary embodiment.

Accordingly, supposing that the first color data is (L*1, a*1, b*1) and the second color data is (L*2, a*2, b*2), the difference between (L*1, a*1, b*1) and (L*2, a*2, b*2) is calculated.

Moreover, in the exemplary embodiment, a direction of the difference between the first color data and the second color data is assumed to be a direction of correction in the color space. Moreover, the difference amount between the first color data and the second color data is assumed to be a maximum value of the correction amount. Specifically, the direction of correction to correct the image data to be outputted to the image forming device 30 is assumed to be the direction of difference in the L*a*b* color space, and the maximum value of the correction amount is assumed to be the difference amount of this difference.

Figure 5A:
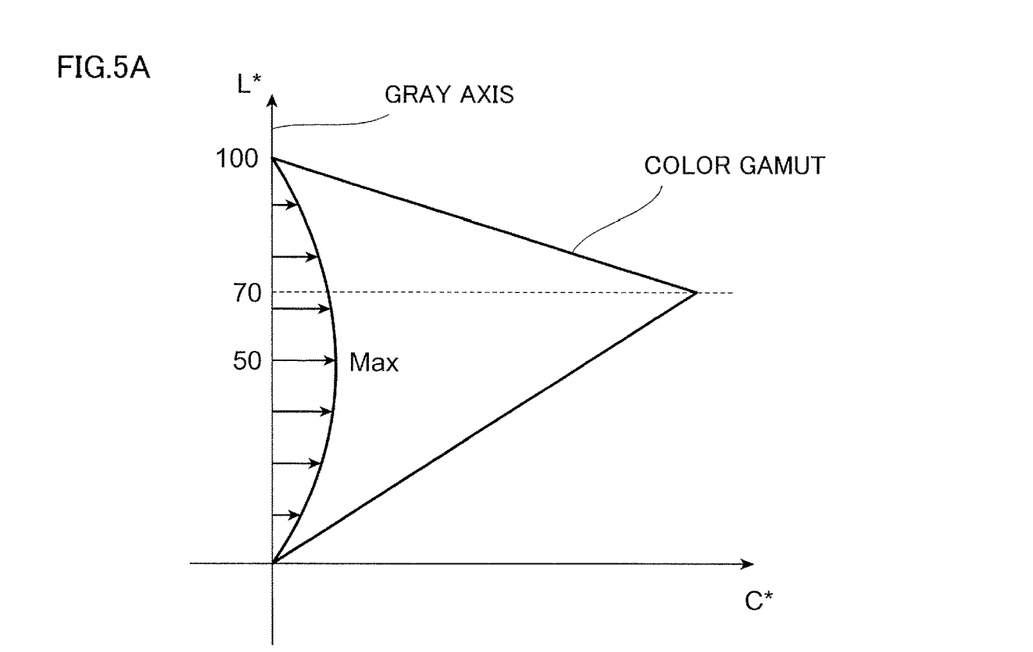
FIGS. 5A and 5B are diagrams showing relation between a color within a color gamut of the image forming device and a correction amount.
Figure 5B:
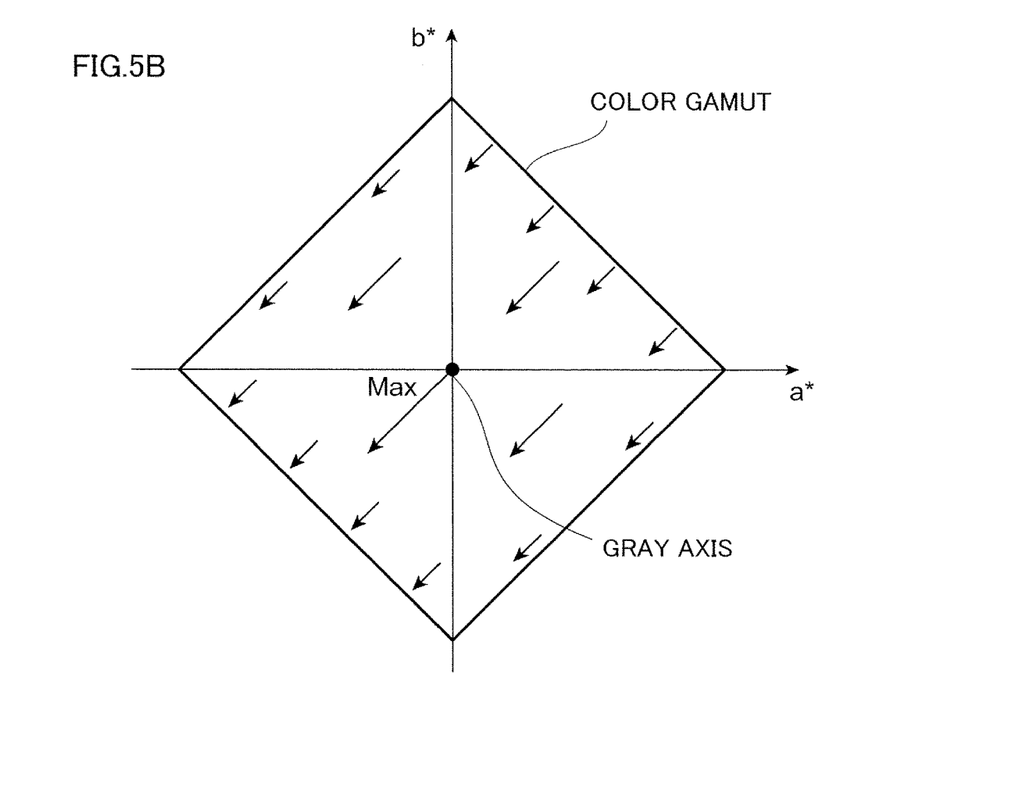

FIGS. 5A and 5B are diagrams showing relation between a color within a color gamut of the image forming device 30 and a correction amount.

In FIG. 5A, the horizontal axis indicates C* that collectively shows a* and b* in one dimension, and the vertical axis indicates L*. Note that C* is expressed as $C^* = \sqrt{(a^*)^2 + (b^*)^2}$.

Moreover, in FIG. 5B, the horizontal axis indicates a* and the vertical axis indicates b*. Moreover, in FIGS. 5A and 5B, a color gamut of the image forming device 30 is also shown. Further, in FIG. 5A, the correction amount on the L* axis, which is a gray axis, is shown by plural arrows, and in FIG. 5B, similarly, the correction amount in the color gamut of the image forming device 30 is shown by plural arrows. In this case, it is indicated that the larger the size of the arrow is, the larger the correction amount is, and the smaller the size of the arrow is, the smaller the correction amount is. Moreover, the direction of the arrow indicates the direction of correction.

Of these, in FIG. 5A, the point where the maximum value of correction is applied is assumed to be (L*, a*, b*)=(50, 0, 0). In other words, the point is assumed to be on the gray axis. As shown in the figure, the correction amount takes the maximum value (Max) at the point of C*=0, L*=50, and the correction amount is reduced as the color to be corrected comes closer to white from the point. Moreover, as the color to be corrected comes closer to black, the correction amount is reduced. Then, at white (C*=0, L*=100) and at black (C*=0, L*=0), the correction amount is assumed to be 0.

Moreover, at the points other than the gray axis, as shown in FIG. 5B, the correction amount is increased as the color to be corrected comes closer to the gray axis, and the correction amount is reduced as the color to be corrected is away from the gray axis. In other words, if L*, which is a brightness value, is the same, the smaller the C* is, the larger the correction amount becomes, and the larger the C* is, the smaller the correction amount becomes. This can also be said that the lower the saturation is, the larger the correction amount becomes, and the higher the saturation is, the smaller the correction amount becomes. Moreover, on the outer shell of the color gamut, the correction amount is 0.

Then, when C* is the same, as the color is larger than L*=50 or is smaller than L*=50, the correction amount is reduced, and the correction amount is maximum at L*=50.

Note that, as shown in FIG. 5B, all the directions of correction are the same. In other words, here, directions of correction are on the a*b* plane, and correction of brightness L* is not performed. That is, only the correction of color is performed to conduct slide correction of a* and b*.

Figure 6:
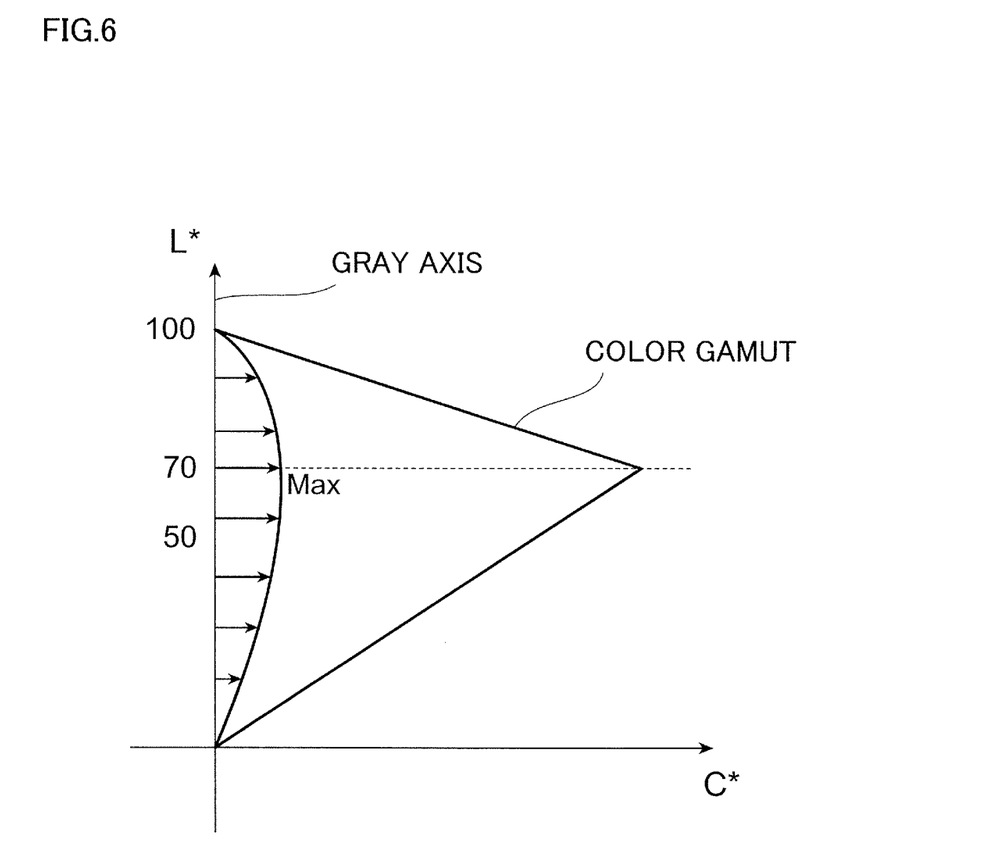
FIG. 6 is a diagram showing an example assuming a point to which a maximum value of correction is applied to be on a gray axis other than (L*, a*, b*)=(50, 0, 0)

Moreover, FIG. 6 is a diagram showing an example assuming a point to which a maximum value of correction is applied to be on the gray axis other than (L*, a*, b*)=(50, 0, 0). Here, the point is assumed to be (L*, a*, b*)=(70, 0, 0).

Here, the higher the saturation on the outer shell of the color gamut of the image forming device 30 is, the larger the correction amount related to gray including brightness at the point including the saturation is made. In other words, in this case, the saturation on the outer shell of the color gamut of the image forming device 30 becomes the highest at L*=70, and in conformity to the point, a point where the maximum value (Max) of correction is applied is assumed to be (L*, a*, b*)=(70, 0, 0). Note that the magnitude relationship of the correction amount or directions of correction at points other than this point are the same as those shown in FIG. 5B.

The conversion relationship to perform correction as described above is also referred to as a profile, and is able to be made, for example, as a three-dimensional LUT (Lookup Table). In other words, when it is assumed that the L*a*b* data before correction is (L*a, a*a, b*a) and the L*a*b* data after correction is (L*b, a*b, b*b), the LUT performs correction of (L*a, a*a, b*a)→(L*b, a*b, b*b). However, the LUT is not limited thereto. For example, the LUT may be a one-dimensional LUT to perform a conversion relationship of L*a→L*b, a*a→a*b and b*a→b*b. The one-dimensional LUT does not perform correction of white color and black color, and performs correction of intermediate colors. Moreover, correction of L*a→L*b, a*a→a*b and b*a→b*b may be performed by gamma conversion.

Returning to FIG. 4, the color correction unit 150 corrects image data to be outputted to the image forming device 30 by use of the conversion relationship created by the conversion relationship creation unit 140. Then, the corrected image data is transmitted to the image forming device 30.

<Description of Operations of Computer Device 10>

Figure 7:
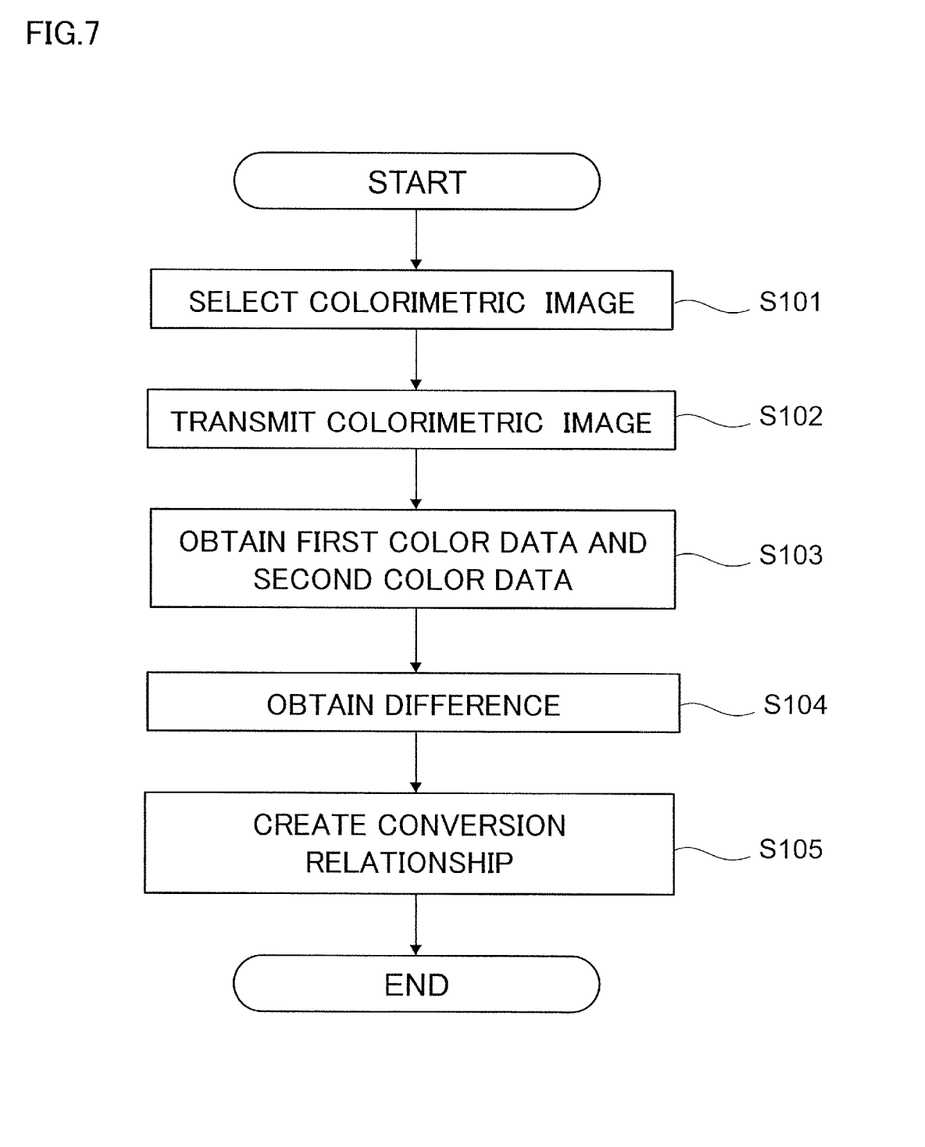
FIG. 7 is a flowchart illustrating operations of the computer device of the exemplary embodiment.

FIG. 7 is a flowchart illustrating operations of the computer device 10 of the exemplary embodiment.

Hereinafter, by using FIGS. 4 and 7, the operations of the computer device 10 will be described.

First, the colorimetric image selection unit 110 selects a colorimetric image (step 101). Here, as the colorimetric image, a white image is selected.

Next, the image data transmission unit 120 outputs colorimetric image data, which is image data of the colorimetric image selected by the colorimetric image selection unit 110, toward the display 20 and the image forming device 30 (step 102). Consequently, in the display 20, the colorimetric image is displayed on the display screen 21 as a first image. Moreover, in the image forming device 30, the colorimetric image is formed on the recording medium P as a second image. Then, colors of these images are read by the colorimeter 50 and transmitted to the computer device 10 as first color data and second color data.

Then, the color data obtaining unit 130 obtains the first color data and the second color data transmitted by the colorimeter 50 (step 103).

Next, the conversion relationship creation unit 140 calculates a difference between the first color data and the second color data (step 104).

Further, as described in FIGS. 5A, 5B and 6, the conversion relationship creation unit 140 creates a conversion relationship to correct image data to be outputted to the image forming device 30 (step 105).

Hereinafter, by use of the conversion relationship, the color correction unit 150 corrects image data to be outputted to the image forming device 30, and transmits corrected image data to the image forming device 30.

Accordingly, when an image is formed on a recording medium P, it is possible to adjust colors in conformity to an illumination environment of a place where the image is viewed.

However, in correcting the image data to be outputted to the image forming device 30, different from the conventional correction method, image data on the gray axis is also corrected. Consequently, even in the state where color adaption partially occurs, the user can adjust the colors with accuracy; therefore, the user tends to feel that the colors of the image displayed on the display screen 21 of the display 20 and the image formed on the recording medium P by the image forming device 30 are integrated.

Moreover, in the example described above, it is assumed that the correction amount of black is 0 and the correction amount of the outer shell of the color gamut is also 0; however, these are not necessarily be required. However, by doing so, the image formed on the recording medium P by the image forming device 30 becomes more natural.

Moreover, in the above-described example, the first image is displayed on the display screen 21 of the actual display 20 and the second image is formed on the recording medium P by the image forming device 30, and these images are measured by the colorimeter 50 to obtain the first color data and the second color data; however, the present invention is not limited thereto. For example, as the first color data and the second color data, those in a catalog or the like that have already been prepared can be obtained.

Further, in the above-described example, the colorimetric image selection unit 110 selects the white image as the colorimetric image; however, the present invention is not limited thereto and a colorimetric image including the other colors may be selected.

<Description of Program>

The process performed by the computer device 10 in the exemplary embodiment described above may be provided as, for example, a program such as application software.

Accordingly, the process performed by the computer device 10 in the exemplary embodiment can be recognized as a program that causes a computer to execute functions including: obtaining first color data that is color data of a first image displayed on a display 20 based on image data and second color data as color data of a second image formed on a recording medium P by an image forming device 30 based on the image data; and creating a conversion relationship to correct the image data to be outputted to the image forming device 30 based on the first color data and the second color data to integrate colors of an image displayed on the display 20 and an image formed on a recording medium P by the image forming device 30, wherein the conversion relationship performs correction to increase a correction amount as a color to be corrected comes closer to gray and to reduce a correction amount as a color to be corrected comes closer to white.

Note that it is possible to provide the program that implements the exemplary embodiment by a communication tool, of course, and it is also possible to store thereof in a storage medium, such as a CD-ROM, to be provided.

The foregoing description of the present exemplary embodiment of the present invention has been provided for the purposes of illustration and description. It is not intended to be exhaustive or to limit the invention to the precise forms disclosed. Obviously, many modifications and variations will be apparent to practitioners skilled in the art. The present exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processing device comprising:
    at least one processor configured to execute:
        a color data obtaining unit that obtains first color data that is measured from a first image being displayed on a display using image data and second color data that is measured from a second image formed on a recording medium by an image forming device using the image data; and
        a conversion relationship creation unit that creates a conversion relationship to correct image data to be output to the image forming device using the first color data and the second color data to integrate colors of an image displayed on the display and an image formed on the recording medium by the image forming device,
    wherein the conversion relationship increases a correction amount as a color to be corrected comes closer to gray and reduces a correction amount as a color to be corrected comes closer to white.

2. The color processing device according to claim 1, wherein the conversion relationship reduces a correction amount as a color to be corrected comes closer to black.

3. The color processing device according to claim 2, wherein the first image and the second image are white images, and
    wherein the conversion relationship creation unit sets a direction of difference between the first color data and the second color data of the white images to be a direction of correction in a color space.

4. The color processing device according to claim 3, wherein the conversion relationship creation unit sets an amount of difference between the first color data and the second color data to be a maximum value of the correction amount.

5. The color processing device according to claim 4, wherein, as saturation on an outer shell of a color gamut of the image forming device is increased, the conversion relationship creation unit increases the correction amount related to gray that includes brightness at a point including the saturation.

6. The color processing device according to claim 3, wherein, as saturation on an outer shell of a color gamut of the image forming device is increased, the conversion relationship creation unit increases the correction amount related to gray that includes brightness at a point including the saturation.

7. The color processing device according to claim 2, wherein, as saturation on an outer shell of a color gamut of the image forming device is increased, the conversion relationship creation unit increases the correction amount related to gray that includes brightness at a point including the saturation.

8. The color processing device according to claim 1, wherein the first image and the second image are white images, and
    wherein the conversion relationship creation unit sets a direction of difference between the first color data and the second color data of the white images to be a direction of correction in a color space.

9. The color processing device according to claim 8, wherein the conversion relationship creation unit sets an amount of difference between the first color data and the second color data to be a maximum value of the correction amount.

10. The color processing device according to claim 9, wherein, as saturation on an outer shell of a color gamut of the image forming device is increased, the conversion relationship creation unit increases the correction amount related to gray that includes brightness at a point including the saturation.

11. The color processing device according to claim 8, wherein, as saturation on an outer shell of a color gamut of the image forming device is increased, the conversion relationship creation unit increases the correction amount related to gray that includes brightness at a point including the saturation.

12. The color processing device according to claim 1, wherein, as saturation on an outer shell of a color gamut of the image forming device is increased, the conversion relationship creation unit increases the correction amount related to gray that includes brightness at a point including the saturation.

13. The color processing device according to claim 1, wherein the first color data and the second color data are measured by a colorimeter.

14. The color processing device according to claim 13, wherein the first color data and the second color data are measured by the colorimeter at a same location.

15. The color processing device according to claim 13, wherein the first color data and the second color data are measured by the colorimeter at a location where a user actually views both of the first image being displayed on the display and the second image formed on the recording medium.

16. A color processing system comprising:
    a display configured to display an image using image data;
    an image forming device configured to form an image on a recording medium using the image data; and
    a color processing device configured to correct image data to be output to the image forming device to integrate colors in an image displayed on the display and an image formed by the image forming device,
    wherein the color processing device comprises:
        at least one processor configured to execute:
            a color data obtaining unit that obtains first color data measured from a first image being displayed on the display using the image data and second color data measured from a second image formed on the recording medium by the image forming device using the image data; and a conversion relationship creation unit that creates a conversion relationship to correct image data to be output to the image forming device using the first color data and the second color data to integrate colors of an image displayed on the display and an image formed on the recording medium by the image forming device, wherein the conversion relationship increases a correction amount as a color to be corrected comes closer to gray and reduces a correction amount as a color to be corrected comes closer to white.

17. A non-transitory computer readable medium storing a program that causes a computer to execute functions, the functions comprising:

obtaining first color data measured from a first image being displayed on a display using image data and second color data measured from a second image formed on a recording medium by an image forming device using the image data; and creating a conversion relationship to correct image data to be output to the image forming device using the first color data and the second color data to integrate colors of an image displayed on the display and an image formed on the recording medium by the image forming device, wherein the conversion relationship increases a correction amount as a color to be corrected comes closer to gray and reduces a correction amount as a color to be corrected comes closer to white.

* * * * *